US005512526A

United States Patent [19]
Greco

[11] Patent Number: 5,512,526
[45] Date of Patent: Apr. 30, 1996

[54] HEAVY METAL REMOVAL SYSTEM CONTAINING CLAY, QUATERNARY AMMONIUM COMPOUND, AND MERCAPTAN

[75] Inventor: Carl C. Greco, Garnerville, N.Y.

[73] Assignee: Akzo Nobel NV, Arnhem, Netherlands

[21] Appl. No.: 369,605

[22] Filed: Jan. 6, 1995

[51] Int. Cl.$^6$ .................................................. B01J 21/16
[52] U.S. Cl. ............................................................. 502/80
[58] Field of Search ............................ 502/80; 106/803, 106/159, 244, 287.1

[56] References Cited

U.S. PATENT DOCUMENTS

| | | | |
|---|---|---|---|
| 4,292,035 | 9/1981 | Battrell | 8/137 |
| 4,350,605 | 9/1982 | Hughett | 252/305 |
| 4,740,488 | 4/1988 | Fogler et al. | 502/84 |
| 4,866,018 | 9/1989 | Elliot | 501/148 |
| 4,916,095 | 10/1990 | Fogler et al. | 502/62 |

OTHER PUBLICATIONS

Derwent Patent Abstract No. 76–81926X/44 (1976), abstracting Japanese Patent Publication No. 51/103,900 (Sep. 1976) (no month).

*Primary Examiner*—Gary P. Straub
*Assistant Examiner*—Thomas G. Dunn, Jr.
*Attorney, Agent, or Firm*—Richard P. Fennelly; Louis A. Morris

[57] ABSTRACT

Metal ions can be removed from aqueous by being brought into contact with a heavy metal removal system which comprises an expanded organophilic clay (such as montmorillonite), a fatty alkyl-containing quaternary ammonium compound (such as a chloride comprising a fatty alkyl group containing from about twelve to about twenty-two carbon atoms), and a fatty alkyl-containing mercaptan (comprising a fatty alkyl group containing from about twelve to about twenty-two carbon atoms).

13 Claims, No Drawings

HEAVY METAL REMOVAL SYSTEM CONTAINING CLAY, QUATERNARY AMMONIUM COMPOUND, AND MERCAPTAN

BACKGROUND OF THE INVENTION

The present invention relates to a heavy metal removal system which is useful in the removal of metal ions in aqueous solution.

Various disclosures exist in the art which illustrate clay-supported systems for the removal of undesired pollutants from aqueous solution (e.g, from industrial waste streams), including the following:

U.S. Pat. No. 4,740,488 to H. S. Fogler et al. forms such a system by the treatment of an expanded smectite clay with an excess of a solution of hydroxy-aluminum.

U.S. Pat. No. 4,866,018 to D. R. Elliot discloses organophilic clays made from a smectite type clay, a quaternary ammonium compound, and a zirconium-aluminum organic complex.

U.S. Pat. No. 4,916,095 to H. S. Fogler et al. forms a modified clay sorbent by treatment of an expanded smectite clay, such as montmorillonite, with highly charged inorganic cations which will exchange with hydrated cations in the expanded clay, followed by the reaction of the resulting product with a cationic surfactant.

SUMMARY OF THE INVENTION

The present invention relates to a heavy metal removal system which comprises an expanded organophilic clay, a fatty alkyl-containing quaternary ammonium compound, and a fatty alkyl-containing mercaptan. The clay is a smectite clay, such as montmorillonite. The fatty alkyl-containing quaternary ammonium compound can comprise chloride and, preferably, has from about twelve to about twenty-two carbon atoms in the fatty alkyl group that it contains. The fatty alkyl-containing mercaptan comprises a fatty alkyl group containing from about twelve to about twenty-two carbon atoms.

DESCRIPTION OF PREFERRED EMBODIMENTS

The type of expanded organophilic clay which can be used in the practice of the present invention is exemplified by the types of clays described in U.S. Pat. Nos. 4,866,018 and 4,916,095 to H. S. Fogler et al., which are incorporated herein by reference. Such clays are swelling clays, generically designated as smectites, and have a layered lattice structure in which two-dimensional oxyanions are separated by layers of hydrated cations. Montmorillonite is one such clay which can be selected for use. Such cationic species as the alkali metals, such as sodium, lithium, or potassium, or the alkaline earth metals, such as calcium or magnesium can be the cationic species in such a clay. The expanded clay can be formed by first forming a swelled clay by treating an expandable clay with water followed by reaction of the expanded clay with the selected charged cations.

In accordance with the present invention, the foregoing type of expanded organophilic clay previously described is then treated with a fatty alkyl-containing quaternary ammonium compound of the type described at Col. 2, line 49 to Col. 3, line 29 of U.S. Pat. No. 4,866,018 to D. R. Elliot which is incorporated herein by reference for such disclosure. The chlorides can be selected for use if desired, but the invention is also usable with compounds containing other anions such as bromide, iodide, nitrate, sulfate, hydroxide, and the like. The compound contains at least one fatty alkyl group (preferably of from about twelve to about twenty-two carbon atoms in length) on the nitrogen atom. The remaining substituents on the nitrogen atom can be selected from alkyl of from one to twenty-two carbon atoms, aralkyl such as benzyl or substituted benzyl, aryl such as phenyl or substituted phenyl, and hydrogen.

The quaternary ammonium compound can be used in a stoichiometric amount if the cation to be replaced by the charged ammonium cation in the expanded clay is an alkali metal such as sodium. If an alkaline earth metal cation is present in the expanded clay, its replacement will require an amount of quaternary ammonium compound that is in excess of the stoichiometric amount, for example, about two to four times the amount of cation to be replaced. The treatment can take place at room temperature, if desired.

After the modified clay containing the quaternary ammonium compound has been formed, it can then be treated in accordance with the present invention with a mercaptan compound which comprises a fatty alkyl group which preferably contains from about twelve to about twenty-two carbon atoms. The mercaptan's hydrophobic fatty alkyl group associates in some manner with the fatty alkyl group or groups of the quaternary ammonium compound which in turn is ionically bound to the clay structure. The result is an immobilized ligand having the mercapto functionality (-SH) available for the removal of metal ions from solution. The amount of mercaptan to use in the treatment step will generally be from about 10% to about 30%, based on the weight amount of quaternary ammonium compound that is used. Best results are obtained if temperatures of from about 30° C. to about 80° C., with stirring, are employed in adding the mercaptan compound to the quaternary ammonium-modified clay.

Once the modified clay of the present invention has been used to remove metal ions from solution, it can be regenerated for further use by treatment with a strong mineral acid, such as sulfuric acid or hydrochloric acid, to remove metal species from the mercapto functionality. The regenerating acid will also remove some of the quaternary ammonium compound, with attached mercaptan, from the clay structure so that it is necessary to retreat the clay with these compounds, in proper sequence, if full adsorption capacity of the system is to be obtained for future run(s).

The present invention is further illustrated by the Examples which follow.

EXAMPLES 1–3

These Examples illustrate the preparation of a quaternary ammonium compound (hereinafter also referred to as "quat") immobilized on montmorillonite clay.

Three samples of montmorillonite clay (30 gms) were separately suspended in 100 cc of water at room temperature. To these suspensions were added a solution of 10 gm of cetyl trimethylammonium bromide in 800 cc of water and 100 cc of isopropyl alcohol. The resulting mixtures were then heated to 80° C. and were maintained at this temperature for six hours. At the end of the heating period, the reaction mixtures were cooled to room temperature and were filtered. The precipitates were then washed with 500 cc of water and were then air dried. The yields were almost quantitative with the three clay samples that were used. The following Table shows the type of clay used and the amount of quat on the clay:

| Name of Clay | % Nitrogen | % Quat on Clay |
| --- | --- | --- |
| Na-Acetate Treated Clay* | 1.4 | 55 |
| H₂SO₄-Treated Clay** | 0.7 | 19 |
| Sodium Montmorillonite | 1.1 | 29 |

*obtained from United Catalyst Corp.
**obtained from Quimica Sumex (Mexico).

EXAMPLES 4–6

These Examples illustrate the treatment of the clay/ quaternary ammonium compound samples from Examples 1–3 with metal ions.

The above clays containing various amount of quats from Examples 1–3 were suspended in 500 cc of distilled water. To these solutions were added water solutions of certain metal ions. The metal ion solutions were made up by dissolving 0.117 gm of lead acetate, 0.112 gm of zinc acetate, 0.123 gm of copper acetate, and 0.54 gm of mercury chloride in 500 cc of water. The resulting concentrations were approximately 100 ppm for each of the metal ions. The resulting combination of suspension containing the clay/quat material and the metal ion-containing solutions were stirred at room temperature for four to six hours. The mixtures were then filtered, and the filtrate (1000 cc) was analyzed for parts per million of each metal. The following Table shows the results obtained with each clay/quat system used:

| | Amount of Ions Left in Filtrate | | | | |
| --- | --- | --- | --- | --- | --- |
| Clay/Quat Used | Zn | Cu | Pb | Hg | % Absorbed |
| Example 1 | 48 | 6 | 11 | <.5 | 84 |
| Example 2 | 48 | 22 | 41 | <.5 | 72 |
| Example 3 | 54 | 34 | 54 | <.5 | 65 |

EXAMPLES 7–9

These Examples show the absorption of dodecyl mercaptan onto the previously described clay/quat systems.

A sample (20 gm) of each of the clay/quat compositions of Examples 1–3 was suspended in 500 cc of water at room temperature. To each of these samples was added a solution of 2 gm of t-dodecylmercaptan in 100 cc of tetrahydrofuran (THF). The reaction mixture thus formed was then stirred at room temperature for twenty-four hours. The next day the respective flasks containing each the reaction mixture was each then transferred to a Buchner filtering funnel, and the solid clay/quat/mercaptan product was collected by filtration from each flask. The yield of product was almost quantitative (22 gm). The following Table shows the amount of mercaptan absorbed onto the clay/quat sample (based on sulfur analysis):

| Clay/Quat System of | Percent Sulfur | % mercaptan | Merc/Quat |
| --- | --- | --- | --- |
| Example 1 | 1.1 | 6.9% | 0.12 |
| Example 2 | 0.4 | 2.5% | 0.13 |
| Example 3 | 0.7 | 4.4% | 0.15 |

EXAMPLES 10–12

These Examples illustrate the treatment of the clay/quat/mercaptan system described in Examples 7–9 with metal ions.

Three samples (22 gm) of each of the above clay/quat/mercaptan products prepared in Examples 7–9 were treated with aqueous solutions containing 100 ppm of copper, zinc, lead and mercury ions. The ions were added to water (1000 cc) as their respective acetates or chlorides. The resulting mixtures were stirred at room temperature for five hours and were then filtered and washed with fresh distilled water. The following Table shows the results of using the three clay composition with the analysis by atomic absorption of the resulting filtrates from each of the systems:

| | PPM of Ions in Filtrate | | | | |
| --- | --- | --- | --- | --- | --- |
| Clay/Quat of | Cu | Zn | Pb | Hg | % Absorbed by Clay |
| Example 7 | <1 | 6 | <.5 | <.5 | 94% |
| Example 8 | 35 | 54 | 2 | <.5 | 77% |
| Example 9 | <.1 | .2 | <.5 | <.5 | 99.8% |

COMPARATIVE EXAMPLE 14

Another quat with two hydroxy groups (ETHOQUAD O/12 from Akzo Nobel Chemicals Inc.) was also reacted with sodium montmorillonite clay analogous to the above Example 1.

In this Example, the clay (22 gm) was contacted with 6.6 gm of the quat in 500 cc of water. After filtration of the product from the reaction medium, it was treated with an aqueous solution of the same metal ions used in all of the above Examples. The results with this system showed the following absorption of the ions:

| Metal Ion | Initial Conc. | Final Conc. of Filtrate |
| --- | --- | --- |
| Cu | 100 ppm | 31 ppm (69% absorption) |
| Pb | 100 ppm | 53 ppm (47% absorption) |
| Zn | 100 ppm | 58 ppm (42% absorption) |
| Hg | 100 ppm | 68 ppm (32% absorption) |

COMPARATIVE EXAMPLE 15

This Example illustrates the absorption of certain organic compounds onto the clay/quat system of the present invention.

Into a flask containing 500 cc of water and 50 cc of isopropyl alcohol (IPA) was added 20 gm of the clay of Example 2 containing 19% quat. To this was added 2 gm of N-dodecyl diethanolamine, and resulting mixture was heated to 80° C. The temperature was maintained at 80° C. for six hours. After the heating period, reaction mixture was filtered, and the resulting solid product was used in the next step. This air dried material was added to a flask containing 1000 cc of water and 0.1 gram of copper, zinc, lead and mercury ions as their respective acetates. Stirring was continued at room temperature for five hours, and then the reaction mixture was filtered. The filtrate (1000 cc) was analyzed by atomic absorption and found to containing the following amounts of metal ions:

| Metal Ion | Initial Conc. | Final Conc. in Filtrate |
|---|---|---|
| Cu | 100 ppm | 15 ppm |
| Pb | 100 ppm | 20 ppm |
| Zn | 100 ppm | 38 ppm |
| Hg | 100 ppm | >0.5 ppm |

EXAMPLE 16

This Example illustrates a procedure for the removal of mercury from waste solutions.

Various solutions of the system in accordance with the present invention were prepared by suspended the quat on the clay or the quat/mercaptan on the clay. The system (25 gm) was then placed in one liter of water with vigorous stirring. To this was added various amounts of mercuric chloride so that the final concentration would be 100, 1000, and 10,000 ppm of mercury ions in water. The reaction was stirred for six hours at room temperature and was filtered to isolate the water solution. The filtrate was analyzed for ppm of mercury by atomic absorption analysis. The following Table show the results obtained with various mercury ion concentration and different amounts of systems of the present invention (the first four runs used the system of Example 9, the next two used the system of Example 3, the next to last run used the system of Example 7, and the last run used the system of Example 1):

| % Quat on Clay | Hg/Quat Ratio | Initial Hg (ppm) | Hg-Filtrate (ppm) |
|---|---|---|---|
| 30 | 25 | 100 | <.5 |
| 30 | 25 | 1000 | <.5 |
| 30 | 25 | 10000 | .5 |
| 20 | 25 | 100 | <.5 |
| 30 | — | 100 | <.5 |
| 30 | — | 1000 | <.5 |
| 50 | 25 | 100 | <.5 |
| 50 | — | 100 | <.5 |

From the result of the above Table, it appears that the quat at all levels on the clay was just as effective as the quat/mercaptan/clay in removing mercury from water solutions in the 100 to 1000 ppm range. Also, up to 10,000 ppm of mercury can be removed with only 30% quat and 5% mercaptan on the clay. Since some mercury was detected at this level, this is probably the upper limit for removing mercury from waste streams using the clay/quat/mercaptan system.

EXAMPLE 17

This Example illustrates the preparation of an heavy metal removal system in a packed column and its use for mercury removal from aqueous solution.

In a beaker was mixed 20 gm of sand and 30 gm of the system of Example 9 having a cation exchange capacity of approximately 1 meq/gram of composition towards mercury plus 100 grams of glass beads. This material was added to a column (1.25" by 2') containing 200 cc of water. The solids were allowed to settle and then a quarter inch of sand was put on top of the heavy metal removal composition. The water level was allowed to drop to the top of the solids. Then, a solution of mercury chloride in water at 750 ppm was passed down the column at a rate of 200 cc/hour. The following Table shows the results after various amounts of mercury in water had passed down the column. The results shown are ppm of mercury in the water which had passed down the column during the corresponding hour.

| Time (hrs.) | Amount of Water Added | Mercury (ppm) |
|---|---|---|
| 0 | 0 | 0 |
| 2.5 | 500 | 0 |
| 5.0 | 1000 | 0 |
| 7.5 | 1500 | 0 |
| 10.0 | 2000 | 0 |
| 11.0 | 2250 | 0 |
| 13.0 | 2500 | 10 |
| 14.0 | 2750 | 310 |
| 15.0 | 3000 | 400 |
| 16.0 | 3250 | 470 |
| 17.0 | 3500 | 550 |
| 18.0 | 3750 | 750 |

The results in the above Table indicate 1.88 gm of mercury ions had been absorbed by the column. Almost 2500 cc of mercury solution came over before there was detectable mercury content in the filtrate water. Since the column had an exchange capacity of 30 meq for mercury and 9.4 meq was taken out of solution, the efficiency of the column was 9.4/30 or 31%.

EXAMPLE 18

This Example illustrates regeneration of the column shown in the preceding Example with 3N HCl solution.

The composition saturated with mercury from the preceding Example was separated from the glass beads and was placed in a flask. It was then treated with 500 cc of 3N HCl to remove the mercury. After vigorous stirring for four hours at room temperature, only 10% of the mercury was removed from the solids.

EXAMPLE 19

This Example illustrates copper removal using the column described in Example 17.

Into a glass column (1.75"×2.5') filled with water was placed 50 grams of a clay/quat/mercaptan system from Example 9 and 50 gm of glass beads. The level of the system in the column came up about ten inches from the bottom (volume of 250 cc). The system contained 30% quat and 4% dodecyl mercaptan. Based on the mercaptan and weight of the system in the column, the cation exchange capacity was 0.2 meq/gram. A solution of copper ions in water was passed down the column at a rate of 200 cc per hour. The concentration of the copper solution was 200 ppm. After seven and one half hours and the 1500 cc effluent had come down the column, the effluent was analyzed and was found to contain 0.1 gm of copper ion as compared to a starting amount of 0.3 gm. Therefore, the column had absorbed 0.2 gm of copper ion (3 meq). Since the column contained 5 meq of mercaptan the efficiency of the column was 60%. Regeneration of the column by passing 500 cc of 3N HCl down the column at a rate of 200 cc/hr removed all the copper which was absorbed to the heavy metal removal system.

EXAMPLE 20

This Example illustrates copper, zinc and lead removal using the present invention.

The above column that was regenerated in Example 19 with 3N HCl was used again in another experiment (second cycle) where a solution containing copper, zinc, calcium and lead was passed down through the heavy metal removal system and glass bead composition. A solution was made up of 0.314 gm of copper acetate, 0.183 gm of lead acetate, 0.280 gm of zinc acetate, and 3.675 gm of calcium chloride in 1000 ml of water. The solution was around 100 ppm (0.1 gm) in concentration for the three heavy metals and approximately 1000 ppm for the calcium ion. The following Table show the results obtained on the effluent:

| Time (Hrs) | Ml. Collected as Effluent | Fraction & Amount | Analysis of Fraction | | | |
|---|---|---|---|---|---|---|
| | | | Cu | Zn | Pb | Ca |
| 0 | 0 | 1 | — | — | — | — |
| 1.5 | 200 | 1 (200) | .3 | 34 | 14 | 1000 |
| 4.0 | 800 | 2 (600) | 1 | 67 | 64 | 1000 |
| 5.5 | 1000 | 3 (200) | 2 | 56 | 86 | 1000 |
| Amount Absorbed by Column (in gms): | | | .099 | .032 | .042 | none |
| Percent absorbed by column | | | 99 | 32 | 42 | 0 |

It can be seen from the above Table that the heavy metal removal system column was most selective for copper followed by lead and then zinc. There was no affinity for calcium.

EXAMPLE 21

This Example illustrates the reactivation of the system (quat/mercaptan/clay) in the column of Example 20.

After seven cycles of passing heavy metals down the column and regenerating with 3N HCl, the activity dropped to less than 50% as could be seen by an experiment in which a solution of copper ions (0.2 gm) in 1000 ml of water was passed down the column at a rate of 150 to 200 cc/hr. Analysis of the effluent showed it to contain 0.13 gm of copper ion with only 0.07 gm having been absorbed on the column. Initially, the column could absorb 0.2 gm of copper ion. It was shown that a small amount of quat had leached off the column with each acid regeneration, thus activity was lost because when the quat left the column so did the mercaptan. The column was reactivated by the following process.

Activation by treatment with trimethylcetylammonium bromide was performed by dissolving 15 gm of this quat in 1000 ml of water, and passing the resulting solution down the above-described column. The quat solution was passed down the column at a rate of 120 cc/hr. Activation by dodecyl mercaptan was then done by removing the heavy metal removal system from the column and placing it in a one liter flask with a solution of 5 gm of the mercaptan in 600 cc of a 65/35 THF-water solution. The reaction mixture was stirred vigorously at reflux for five hours and was then filtered. The solid material was washed with 500 cc of water and was then air dried. The dried heavy metal removal system was replaced in the column and was then used in the next Example.

EXAMPLE 22

This Example illustrates the testing of the reactivated clay/quat/mercaptan composition in the packed column that was performed in the preceding Example.

The testing was done by treating the heavy metal removal system with a solution of 0.278 gm of copper acetate in 1000 cc of water. This represented a concentration of 200 ppm of copper ion in solution. Analysis of the effluent that came down the column by atomic absorption showed only 12 ppm of copper in the effluent. The column had absorbed 0.188 gm of copper ion, which was almost the exchange capacity that the heavy metal removal system had originally. The packed column when prepared could absorb 0.2 gm of copper ion and after regeneration the column had (0.188/0.2) 94% of the original exchange capacity.

COMPARATIVE EXAMPLE 23

This Example compares a commercially available ion exchange resin (AMBERLITE IRC-78 brand from Rohm & Haas) with the system of the present invention.

Into the column used in the previous Examples was placed 75 gm of AMBERLITE IRC-718 ion exchange resin and 75 gm of sand and glass beads. A solution of 200 ppm of copper ion dissolved in water was passed down the column. The solution was passed down at a rate of 250 cc per hour. Approximately two liters of solution was passed down the column during this period of time. This calculates to be 0.4 gm of copper ion. The following Table shows the amount of copper remaining in each fraction after it had been through the column:

| Time | Amt. Collected | Fraction No. | Cu (ppm) in Filtrate |
|---|---|---|---|
| 0 | 0 | 1 | 0 ppm |
| 1.5 | 250 | 1 | |
| 3.0 | 500 | 1 | >1 ppm |
| 4.5 | 750 | 2 | |
| 6.0 | 1000 | 2 | >1 ppm |
| 7.5 | 1250 | 3 | |
| 9.0 | 1500 | 3 | >1 ppm |
| 10.5 | 1750 | 4 | |
| 12.0 | 2000 | 4 | >1 ppm |
| 13.5 | 2500 | 5 | |
| 15.0 | 3000 | 6 | >1 ppm |

The following Table illustrates the results that were obtained when the copper concentration was increased in the aqueous solution to 400 ppm:

| Time | Amt. Collected | Fraction No. | Cu (ppm) in Filtrate |
|---|---|---|---|
| 0 | 0 | 7 | 0 ppm |
| 3.0 | 500 | 7 | <10 ppm |
| 6.0 | 1000 | 8 | <10 ppm |
| 9.0 | 1500 | 9 | <10 ppm |
| 12.0 | 2000 | 10 | <10 ppm |

It can be seen from the above Tables that 1.4 gm of copper was absorbed on the column without a breakthrough occurring. The volume of the heavy metal removal systems in the column was equal to the same volume of the clay/quat/mercaptan system of the present invention. Since the system of the present invention could only abstract 0.2 gm of copper, the commercial ion exchange resin was able to extract in excess of 1.4 gm of copper. Therefore, based on a volume to volume comparison, the commercial ion exchange resin was at least seven times better in absorbing copper from aqueous solutions. On a weight to weight comparison, the column in accordance to the invention could absorb 0.3 gm of $Cu^{+2}$, while the commercial ion exchange resin could absorb at least 1.4 gm of copper ions. Therefore, the commercial ion exchange resin, on weight basis, has almost a five times more absorbing capacity then the clay/quat/mercaptan system.

The foregoing Examples illustrate certain preferred embodiments of the present invention and, for that reason should not be construed in a limiting sense. The scope of protection sought is set forth in the claims which follow.

I claim:

1. A heavy metal removal system which comprises an expanded organophilic clay, a fatty alkyl-containing quaternary ammonium compound, and a fatty alkyl-containing mercaptan wherein the fatty alkyl-containing compounds contain from about twelve to about twenty-two carbon atoms.

2. A system as claimed in claim 1 wherein the clay is a smectite clay.

3. A system as claimed in claim 2 wherein the smectite clay is montmorillonite.

4. A system as claimed in claim 1 wherein the fatty alkyl-containing quaternary ammonium compound comprises chloride.

5. A system as claimed in claim 1 wherein the fatty alkyl-containing quaternary ammonium compound comprises chloride.

6. A system as claimed in claim 1 wherein the clay is a smectite clay, the fatty alkyl-containing quaternary ammonium compound comprises chloride.

7. A system as claimed in claim 6 wherein the smectite clay is montmorillonite.

8. A system as claimed in claim 1 wherein the clay is a smectite clay.

9. A system as claimed in claim 1 wherein the clay is montmorillonite.

10. A system as claimed in claim 1 wherein the fatty alkyl-containing quaternary ammonium compound comprises chloride.

11. A system as claimed in claim 2 wherein the fatty alkyl-containing quaternary ammonium compound comprises chloride.

12. A system as claimed in claim 1 wherein the clay is a smectite clay, and the fatty alkyl-containing quaternary ammonium compound comprises chloride.

13. A system as claimed in claim 12 wherein the smectite clay is montmorillonite.

* * * * *